(12) United States Patent
Nachum (10) Patent No.: US 8,179,821 B2
(45) Date of Patent: May 15, 2012

(54) IDENTIFYING PARTICIPANTS OF AN AUDIO CONFERENCE CALL

(75) Inventor: Assaf Nachum, Petach Tikva (IL)

(73) Assignee: Comverse, Ltd., Tel Aviv (IL)

( * ) Notice: Subject to any disclaimer, the term of this patent is extended or adjusted under 35 U.S.C. 154(b) by 1322 days.

(21) Appl. No.: 11/767,726

(22) Filed: Jun. 25, 2007

(65) Prior Publication Data

US 2008/0316944 A1  Dec. 25, 2008

(51) Int. Cl.
*H04L 12/16* (2006.01)

(52) U.S. Cl. .......................... 370/260; 370/270

(58) Field of Classification Search .................. None
See application file for complete search history.

(56) References Cited

U.S. PATENT DOCUMENTS

| | | | |
|---|---|---|---|
| 6,288,740 B1 * | 9/2001 | Lai et al. | 348/14.09 |
| 7,483,400 B2 * | 1/2009 | Kuusinen et al. | 370/267 |
| 7,508,413 B2 * | 3/2009 | Nose | 348/14.09 |
| 7,664,246 B2 * | 2/2010 | Krantz et al. | 379/202.01 |
| 7,917,366 B1 * | 3/2011 | Levanon et al. | 704/270 |
| 2002/0181686 A1 * | 12/2002 | Howard et al. | 379/202.01 |
| 2004/0125932 A1 * | 7/2004 | Orbach et al. | 379/202.01 |
| 2005/0135583 A1 * | 6/2005 | Kardos | 379/142.01 |
| 2005/0243810 A1 * | 11/2005 | Nose | 370/356 |
| 2006/0055771 A1 * | 3/2006 | Kies | 348/14.03 |
| 2006/0168266 A1 * | 7/2006 | Phillips et al. | 709/230 |
| 2008/0267282 A1 * | 10/2008 | Kalipatnapu et al. | 375/240.01 |

* cited by examiner

*Primary Examiner* — Hong Cho
(74) *Attorney, Agent, or Firm* — Ohlandt, Greeley, Ruggiero & Perle, L.L.P.

(57) ABSTRACT

An apparatus for identifying participants of a conference call in a telephony network, each participant using a respective channel to participate in the conference call, the apparatus including: a sampler, deployed in the telephony network, and configured to continuously sample each of the channels during the conference call, a dominant channel identifier, in communication with the sampler, and configured to identify in real time a dominant one of the sampled channels, and a current speaker data disseminator, in communication with the dominant channel identifier, and configured to disseminate, in real time, data pertaining to a participant who uses the dominant channel to at least one remaining participant of the conference call, so as to identify the participant who uses the dominant channel as a current speaker to the remaining participant.

32 Claims, 8 Drawing Sheets

IDENTIFYING PARTICIPANTS OF AN AUDIO CONFERENCE CALL

FIELD AND BACKGROUND OF THE INVENTION

The present invention relates to audio conferencing and, more particularly, but not exclusively to a method and apparatus for identifying participants of an audio conference call.

Audio conferencing is a concept well known in the art. More specifically, audio call conferencing is very frequently implemented in both fixed and cellular telephony networks. Typically, audio call conferencing allows more than two parties, or communication terminals, to be involved in the same communications session. For example, when two parties are involved in a communications session, it may be desirable to invite one or more parties to the same session.

This may be achieved by dialing a special code number in communication with a call conferencing service activation feature, followed by the identification number of the party to be invited. A telephone switch then connects that party to the ongoing voice call between the first and the second party.

With the fast evolution of telephone networks, various communications protocols have defined new and more flexible manners of handling voice and data call sessions in telecommunications networks.

Figure 1:
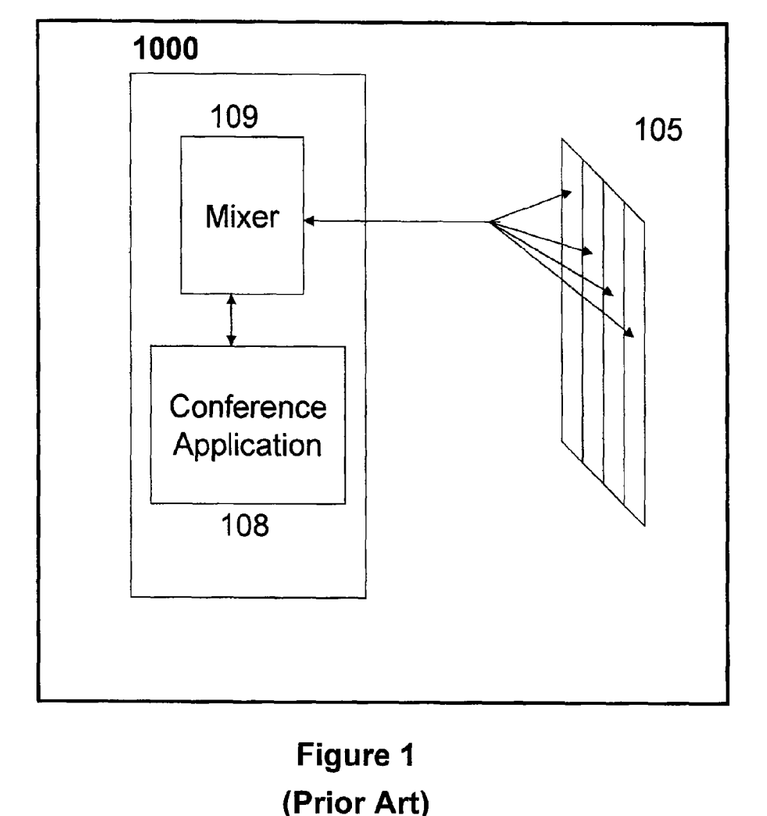
FIG. 1 is a simplified block diagram illustrating a system for audio conference management in a prior art telephony network.

Reference is now made to FIG. 1, which is a simplified block diagram illustrating a system for audio conference management in a prior art telephony network.

Audio call conferencing service is often provided using a supplementary audio conference management system 1000, which resides within a telephony network.

An exemplary supplementary audio conference management system 1000 includes two sub systems:

(a) An Audio Conference Application 108, which mainly handles the provisioning of the audio conferencing services—such as participants information and preferences, Scheduling (On Line, Pre Called), Resource Management, User permissions, Session Database, GUI etc, as known in the art.
(b) An Audio Conference Mixer 109 which handles all telephony control aspects, such as termination of all conference lines, termination of all Call Signaling Information and to mix audio signals received from the Rx (Received) Channels (i.e. the data channel or phone line used by each of the participant of the call) back to the Tx (Transmitted) Channels (which may be the same channels used by the participant of the call), as known in the art. The Mixer may be implemented as a bridge, MRF (Media Resource Function) or MCU (Multipoint Control Unit), as known in the art.

That is to say, audio data packets (or audio signals) received from the participants of the conference call through data channels 105, where each participant uses a dedicated data channel are mixed together. Then, a resultant mixed signal is sent back to all participants, through the data channels 105.

One of the inconveniences during audio conference calls is that conference participants sometimes cannot identify the current speaker. This usually happens because of voice distortions, bad communication lines, background noises, or just because the participants of the audio conference are not familiar with each other.

In Telephony Networks, the fact that only one current speaker is talking does not prevent the voices of remaining participants of the call conference from being mixed together and heard in the conference.

More specifically, in current Voice over Internet Protocol (VoIP) Telephony Networks, there is no clear indication of a current speaker since VoIP is a Packet Switch (PS) based Technology (unlike legacy PLMN which is a Circuit Switch (CS) based technology, which allows clear identification of the speaker's line).

According to Request for Comments (RFC) No. 3550, the audio conference mixer marks all Media Contributing sources indicated by CSRCs to the Conference Audio RTP (Real Time Transport Protocol) mixed stream, hence making it more difficult to pin point the current speaker.

A CSRC (Contributing Source) is an indicator of a contributing stream of RTP data packets. The CSRC are indicated within the combined stream produced by an RTP mixer. Each CSRC is related to a specific one of the participants in the conference call.

Usually, there is a problem of background noise injected from all participants of the conference call. Consequently, the audio conference mixer combines all Contributing Sources (indicated by CSRCs) into the single RTP packet stream, and sends the combined steam to all participators of the conference call.

The background noise problem is further aggravated by the comfort noise injected intentionally by VoIP (Voice over Internet Protocol) Handsets, as described by RFC 3389, entitled "Real Time Transport Protocol (RTP) Payload for Common Noise (CN).

Existing solutions do not provide any means to identify the current speaker, in real time. However, some current solutions may declare participant's name when the participant joins or leaves the conference, which is independent of whether a participant is speaking. Some current solutions are based on prerecording of the participants' names at the beginning of a voice call conference.

For example, the Session Initiation Protocol (SIP) is an Internet Engineering Task Force (IETF) standard protocol for initiating an interactive user session. The interactive user session may involve multimedia elements such as video, voice, chat, gaming, and virtual reality. Like the Hyper Text Terminal Protocol (HTTP), or the Simple Mail Transfer Protocol (SMTP), SIP works in the Application layer of the Open Systems Interconnection (OSI) communications model.

SIP can establish multimedia sessions or Internet telephony calls, and modify or terminate them. Because SIP supports name mapping and redirection services, SIP makes it possible for users to initiate and receive communications and services from any location, and for networks to identify the users wherever they are. SIP is a request-response protocol, dealing with requests from clients and responses from servers.

Participants are usually identified by SIP Uniform Resource Locators (URLs) or Uniform Resource Identifiers (URIs), although SIP also supports E.164 telephone number addressing. Requests can be sent through any transport protocol, such as the User Datagram Protocol (UDP), the Simple Control Transport Protocol (SCTP), or the Transfer Control Protocol (TCP).

SIP determines the end system to be used for the session, the communication media and media parameters, and the called party's desire to engage in the communication. Once these are assured, SIP establishes call parameters at either ends of the communication, and handles call transfer and termination.

There are a few SIP Requests for Comments (RFCs) that mention services for identifying a current speaker during a voice conference call session:

RFC 3550 paragraph 3 [2] describes: "Contributing Source (CSRC) . . . An example application is audio conferencing where a mixer indicates all the talkers whose speech was combined to produce the outgoing packet, allowing the receiver to indicate the current talker, even though all the audio packets contain the same SSRC identifier (that of the mixer)".

RFC 4575 paragraph 5.8.4, defines the ability to query the conference application by using SIP event package for conference state. SIP event package for conference state utilizes SIP SUBSCRIBE/NOTIFY mechanism to inform members about the current speaker.

RFC 4575 also adds that: "If an RTP mixer compliant to the above is used, participants can perform an SSRC to user mapping and identify a current speaker".

None of the RFCs cited above define a method of determining a current speaker ID.

There is thus a widely recognized need for, and it would be highly advantageous to have, a system devoid of the above limitations.

SUMMARY OF THE INVENTION

According to one exemplary embodiment of the present invention there is provided an apparatus for identifying participants of a conference call in a telephony network, each participant using a respective channel to participate in the conference call, the apparatus comprising: a sampler, deployed in the telephony network, and configured to continuously sample each of the channels during the conference call, a dominant channel identifier, in communication with the sampler, and configured to identify in real time a dominant one the sampled channels, and a current speaker data disseminator, in communication with the dominant channel identifier, and configured to disseminate in real time data pertaining to a participant who uses the dominant channel to at least one remaining participant of the conference call, so as to identify the participant who uses the dominant channel as a current speaker to the at least one remaining participant.

According to a second exemplary embodiment of the present invention there is provided a method for identifying participants of a conference call in a telephony network, each participant using a respective channel to participate in the conference call, the method comprising: continuously sampling each of the channels during the conference call; identifying, in real time, a dominant one the sampled channels; and disseminating, in real time, data pertaining to a participant who uses the dominant channel to at least one remaining participant of the conference call so as to identify the participant who uses the dominant channel as a current speaker to the at least one remaining participant.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of exemplary embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the exemplary embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE EXEMPLARY EMBODIMENTS

The present embodiments comprise an apparatus and method for identifying participants of an audio conference call in a telephony network.

According to exemplary embodiments of the present invention, channels used by participants of a conference call are continuously sampled and compared.

Each participant of a phone call uses a certain channel (such as a phone line, data channel, etc., as known in the art), for participating in the conference call.

The channels may be sampled with respect to qualities of signals transmitted through the channel, such as audio energy (e.g.,, intensity of the signal, intensity of the signal over a predefined frequency range, intensity of the signal over a predefined period of time, etc.), or a combination of qualities.

When one of the participants speaks, the specific channel used by the current speaker (i.e the participant who speaks) is automatically identified as a dominant channel.

For example, audio energies may be continuously sampled in the channels. The audio energies among the channels are continuously compared. When the audio energy is significantly higher in one of the channels (i.e. the channel used by the current speaker), the channel with the higher energy is identified as a dominant channel.

Following the identification of the dominant channel, data pertaining to the identity of the current speaker (such as Caller Identification Data) is disseminated in real time to one or more of remaining participants of the conference call, for example, as Alert SMS (Short Message Service) messages, as described in further detail hereinbelow.

The channels are continuously monitored throughout the conference call. Whenever one of the participants speaks, the specific channel used by the current speaker is identified in real time as a dominant channel. Then, data pertaining to the current speaker is disseminated in real time to one or more of remaining participants of the conference call.

Optionally, the data pertaining to the current speaker is disseminated only to participants subscribed to service for identifying participants of a conference call as described in further detail hereinbelow.

The monitoring of the channels, the identification of the dominant channel, and the dissemination of data pertaining to the current speaker in real time may vary in accordance with technologies used in the telephony network.

The technology used for implementing the call may include VoIP based on H.323 (The International Telecommunications Union standard for videoconferencing over local area networks and packet-switched networks in general), VoIP based on SIP (Session Initiation Protocol), the traditional Public Land Mobile Network (PLMN), or any other technology known in the art.

The principles and operation according to exemplary embodiments of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Figure 2:
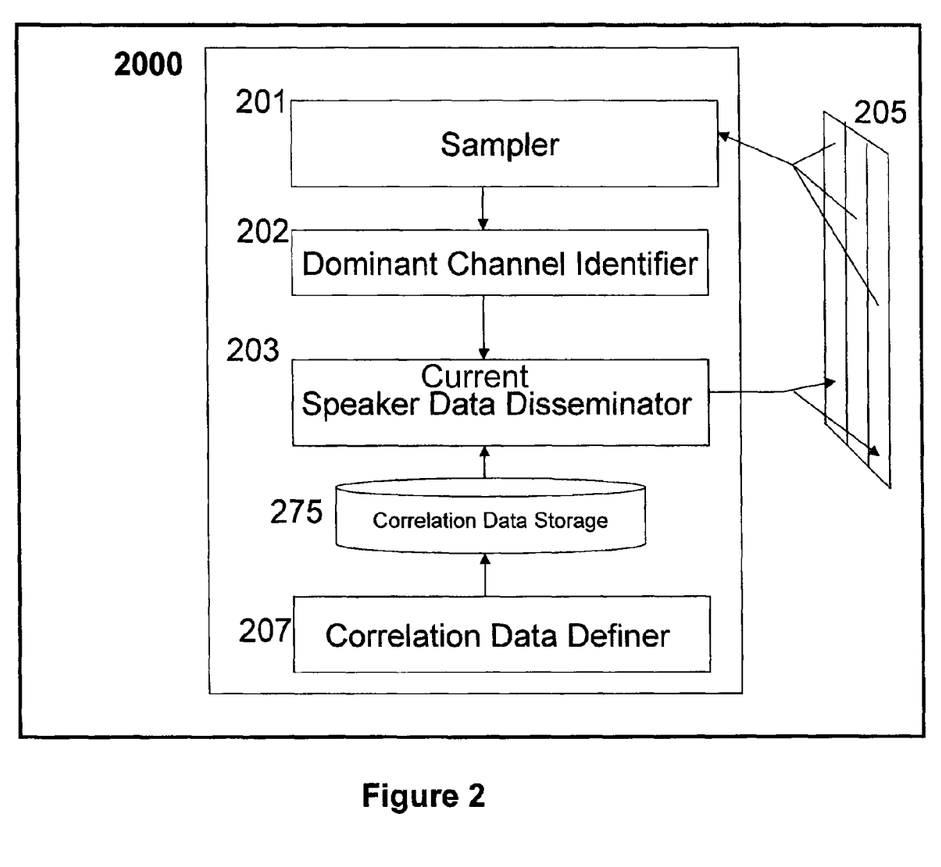
FIG. 2 is a simplified block diagram illustrating a first exemplary embodiment for identifying participants of a conference call in a telephony network.

Reference is now made to FIG. 2, which is a simplified block diagram illustrating a first exemplary embodiment for identifying participants of a conference call in a telephony network.

Apparatus 2000 is used for identifying participants of a conference call in a telephony network, where each participant uses a participant specific channel 205 to participate in the conference call.

Apparatus 2000 includes a sampler 201, deployed in the telephony network.

The sampler 201 continuously samples each of the channels 205 during the conference call. The sampling may be carried out with respect to one or more audio signal qualities, such as intensity, frequency, etc., as described in further detail hereinbelow.

Optionally, the sampler 201 also includes filters for filtering audio signals transmitted in each of the channels in order to remove or reduce noise.

Apparatus 2000 also includes a dominant channel identifier 202, which may be in communication with the sampler 201.

The dominant channel identifier 202 continuously compares the audio energy measured among each of the channels 205.

When one of the participants of the conference call speaks, the dominant channel identifier 202 identifies the channel which has the highest audio energy (as measured in real time) as the dominant channel, as described in further detail hereinbelow.

Apparatus 2000 also includes a current speaker data disseminator 203, in communication with the dominant channel identifier 202.

The current speaker data disseminator 203 disseminates in real time data pertaining to a participant who uses the dominant channel to one or more remaining participants of the conference call. By disseminating the data, the current speaker data disseminator 203 identifies the participant who uses the dominant channel as the current speaker to the remaining participants.

Optionally, the current speaker data disseminator 203 extracts the data pertaining to the participant who uses the dominant channel from correlation data, which may reside in correlation data storage 275, such as a dedicated database. Optionally, the correlation data is generated and stored in advance of the conference call, for example, by a telephony network operator. The correlation data may also be generated and stored in real time, by, for example, a mixer 109, as described in further detail hereinbelow.

The current speaker data disseminator 203 sends the data pertaining to the participant to one or more of the remaining participants, using one of methods known in the art, such as Alert SMS (Short Message Service) messages, as described in further detail hereinbelow.

That is to say, the sampler 201 continuously samples each of the channels 205 throughout the conference call, by, for example, measuring a certain quality (such as the intensity of the signal over a predefined period of time) in the channel 205.

Each time a new participant of the conference call speaks, the dominant channel identifier 202 identifies the channel used by the presently speaking participant as the dominant channel.

For example, the dominant channel identifier 202 may compare audio signal intensity in each of the channels 205, and identify the channel which has the highest signal intensity (i.e. the channel used by the presently speaking participant) as the dominant channel.

Then, the current speaker data disseminator 203 disseminates in real time data pertaining to the presently speaking participant (who uses the dominant channel) to one or more remaining participants of the conference call. Using the data, the current speaker data disseminator 203 identifies the speaking participant to the remaining participant(s) as a current speaker, as described in further detail hereinbelow.

Preferably, the current speaker data disseminator 203 disseminates the data pertaining to the current speaker (i.e. the participant who uses the dominant channel) to the remaining participant of the conference call, through the sampled channels 205.

Optionally, the current speaker data disseminator 203 disseminates the data pertaining to the current speaker only to predefined participants of the conference call. For example, the current speaker data disseminator 203 may be configured to disseminate the data pertaining to the current speaker only to those participants who subscribe to a service for identifying participants of an audio conference call in advance of the audio conference call.

Optionally, the current speaker data disseminator 203 disseminates data pertaining to the current speaker to the remaining participants of the conference call, using Source Description (SDES) Data Packets, as described in further detail hereinbelow.

Optionally, the current speaker data disseminator 203 disseminates data pertaining to the current speaker to the remaining participants of the conference call, using ISDN (Integrated Services Digital Network) User Part (ISUP) User-To-User (USR) Messages, as described in further detail hereinbelow.

Optionally, the current speaker data disseminator 203 disseminates data pertaining to the current speaker to the remaining participants of the conference call, using Flash SMS (Short Message Service) messages, as described in further detail hereinbelow.

Optionally, the current speaker data disseminator 203 disseminates data pertaining to the current speaker to the remaining participants of the conference call, using Unstructured Supplementary Service Data (USSD) messages, as described in further detail hereinbelow.

Optionally, the current speaker data disseminator 203 disseminates data pertaining to the current speaker to the remaining participants of the conference call, using an open General Packet Radio Service GPRS connection to client agents installed on telephony devices used by the remaining participants.

Optionally, apparatus 2000 also includes a correlation data definer 207.

The correlation data definer 207 may be coupled to the current speaker data disseminator 203, using, for example, a correlation database 275 accessible to both the current speaker data disseminator 203 and the correlation data definer 207, as described in further detail hereinbelow.

The correlation data definer 207 defines correlation data between one or more of the participants and the respective channel used by the specific participant.

For example, the correlation data definer 207 may retrieve Line IDs from a conference management system used for managing the conference call.

The correlation data definer 207 may receive the line IDs such as '+972-3-4567543', 'Alice@Domain.com', etc. from each participant specific channel used by a participant of the conference call, as known in the art.

Then, the correlation data definer 207 correlates each line ID with the specific channel, thus defining correlation data between the participant specific channel and the participant who uses the channel.

Optionally, the correlation data definer 207 stores the correlation data in a correlation data storage 275, such as a dedicated database, as described in further hereinabove.

The current speaker data disseminator 203 may retrieve the correlation data, and use the correlation data for identifying the participant who uses the dominant channel to the remaining participants as a current speaker.

For example, a participant may be identified as '+972-12-3456789'. When the specific participant speaks, the current speaker data disseminator 203 may send a USSD (Unstructured Supplementary Service Data) message bearing '+972-12-3456789' to the remaining participants of the conference call, in real time, as described in further detail hereinbelow.

Figure 3:
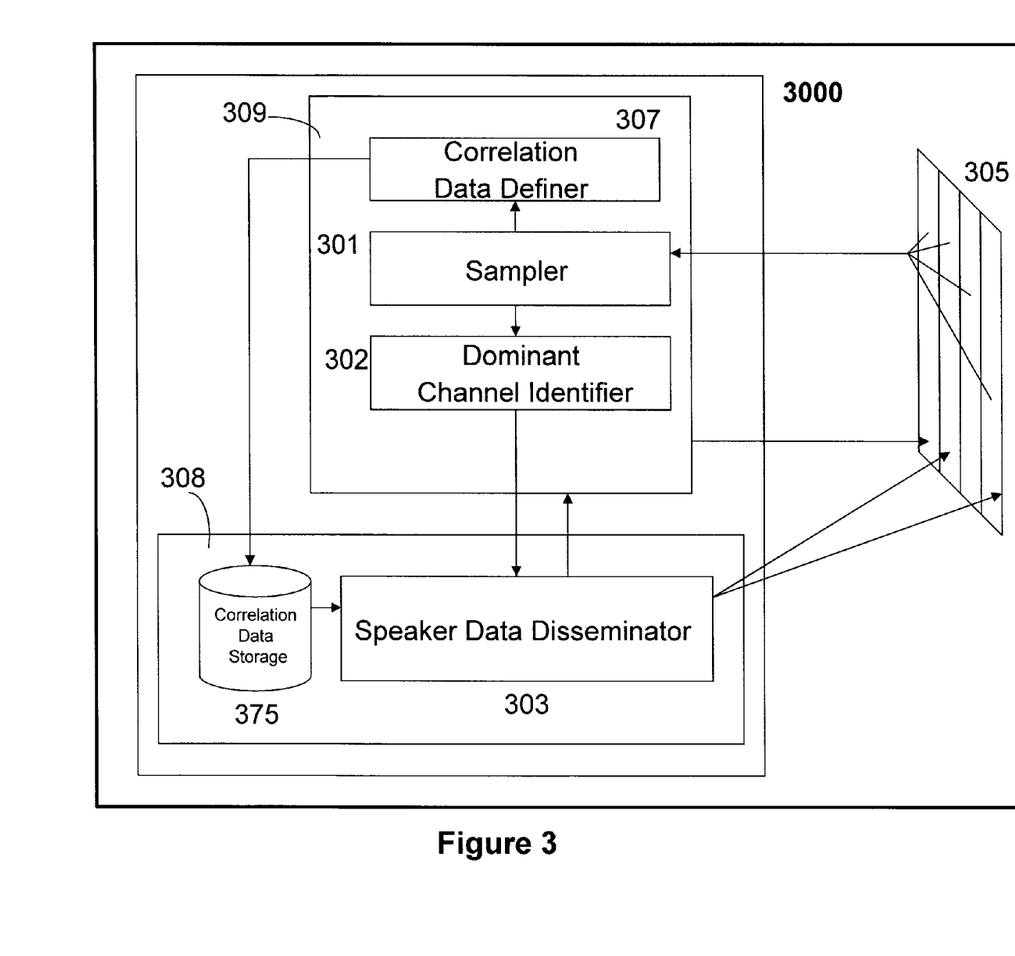
FIG. 3 is a simplified block diagram illustrating a second exemplary embodiment for identifying participants of a conference call in a telephony network.

Reference is now made to FIG. 3, which is a simplified block diagram illustrating a second embodiment for identifying participants of a conference call in a telephony network.

Apparatus 3000 is used for identifying participants of a conference call in a telephony network, where each participant uses a specific one of the channels 350, to participate in the conference call, as described in further detail hereinabove.

Apparatus 3000 includes a sampler 301. Optionally, the sampler 301 is implemented on an audio conference mixer 309, or connected to an audio conference mixer 309.

The audio conference mixer 309 handles all telephony control aspects of the conference call, such as termination of all conference lines, and termination of all call signaling information.

The audio conference mixer 309 also mixes audio signals received from the participators through the channels 305 to a single mixed signal. The single mixed signal is sent back to all participators of the conference call, via the channels 305, by the audio conference mixer 309, as described in further detail hereinabove, using FIG. 1.

Throughout the conference call, the sampler 301 continuously samples each of the channels 305 received by the audio conference mixer 309. For example, the sampler 301 may measure the channel's audio energy, as described in further detail hereinabove.

Apparatus 3000 also includes a dominant channel identifier 302, in communication with the sampler 301.

The dominant channel identifier 302 identifies in real time a dominant one amongst the channels 305, using the continuous sampling.

For example, the dominant channel identifier 302 may continuously compare the audio energies among the sampled channels 305, and identify that channel which has the highest audio energy as the dominant channel, as described in further detail hereinabove.

Apparatus 3000 also includes a current speaker data disseminator 303, in communication with the dominant channel identifier 302.

Optionally, the current speaker data disseminator 303 is implemented as a part of a conference call management's audio conference management application 308, or in communication with an audio conference management application 308, as described in further detail hereinabove.

The current speaker data disseminator 303 disseminates in real time data pertaining to a participant who uses the dominant channel to one or more of the remaining participants of the conference call. By disseminating the data, the current speaker data disseminator 303 identifies the participant who uses the dominant channel as the current speaker to the remaining participants, as described in further detail hereinabove.

Optionally, the current speaker data disseminator 303 disseminates the data to the remaining participants using the audio conference mixer 309, say as an RTCP (Real Time Control Protocol) SDES (Source Description) data packet, in a VoIP network, as described in further detail hereinbelow.

Optionally, the current speaker data disseminator 303 disseminates the data to the remaining participants directly, as Flash SMS (also referred to as Alert SMS), as described in further detail hereinbelow.

Optionally, apparatus 3000 also includes a correlation data definer 307.

Optionally, the correlation data definer 307 is implemented on the audio conference mixer 309.

Optionally, the correlation data definer 307 is implemented in communication with the audio conference mixer 309.

Optionally, the correlation data definer 307 is in communication with the sampler 301.

Optionally, the correlation data definer 307 is implemented on the audio conference mixer 309, in communication with the sampler 301.

The correlation data definer 307 defines correlation data between one or more of the participants and the respective channel 305 used by the specific participant, as described in further detail hereinabove.

Optionally, the correlation data definer 307 stores the correlation data in a correlation data storage 375, such as a database, as described in further detail hereinabove.

Optionally, the correlation data storage 375 is a part of, or is connected to the audio conference management application 308, as described in further detail hereinbelow.

The current speaker data disseminator 303 may use the correlation data, for identifying the participant who uses the dominant channel to the remaining participants as a current speaker in real time, as described in further detail hereinabove.

Optionally, the current speaker data disseminator 303 retrieves the correlation data from the correlation data storage 375, as described in further detail hereinabove.

Figure 4:
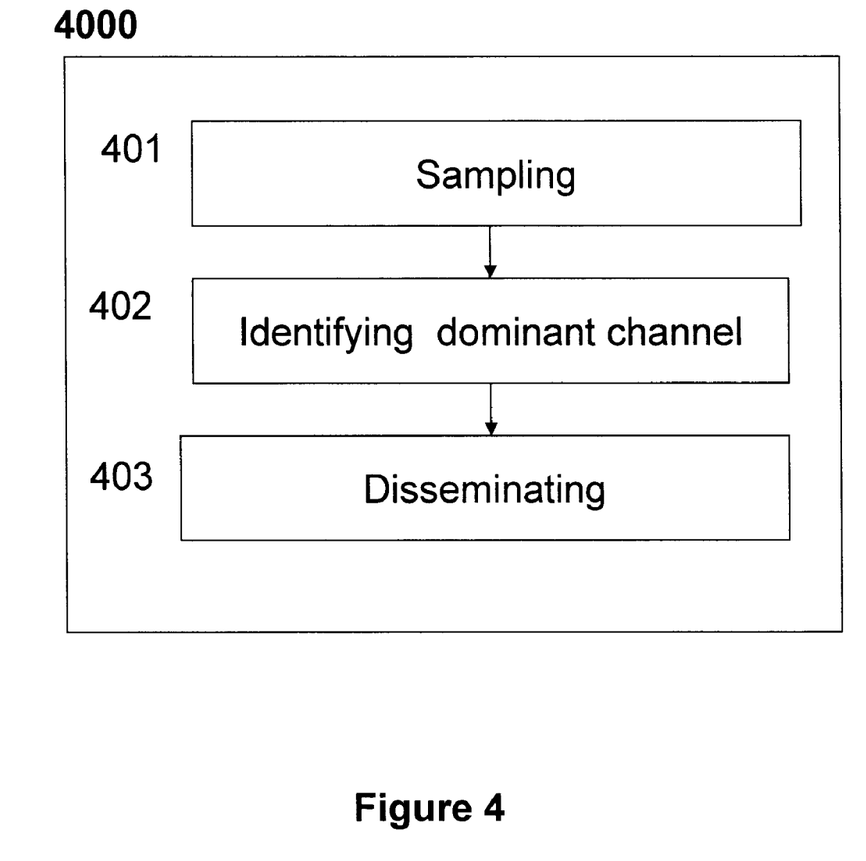
FIG. 4 is a flowchart illustrating a method for identifying participants of a conference call in a telephony network, according to an exemplary embodiment of the present invention.

Reference is now made to FIG. 4, which is a flowchart illustrating a method for identifying participants of a conference call in a telephony network, according to an exemplary embodiment of the present invention.

Typically, each participant of the conference call uses a channel assigned to the participant by the telephony network (a data channel, a phone line, etc., as known in the art).

According to an exemplary embodiment, each of the channels used by the participants is continuously sampled 401 throughout the conference call, in real time, say by a sampler 301.

The channels may be sampled 401 with respect to qualities of audio signals transmitted through the channel, such as intensity of the signal, intensity of the audio signal over a predefined frequency range, intensity of the signal over a predefined period of time (say, a frequency range characteristic of human voice), or a combination of qualities.

Whenever one of the participants of the conference call speaks, a dominant channel is identified 402 in real time, by for example a dominant channel identifier 302, as described in further detail hereinabove.

For example, the channels may be sampled and compared with respect to the intensity of the signal transmitted in each of the channels. When one of the participants speaks, the intensity of signal in a channel used by the current speaker is significantly higher than the intensity of signal in the remaining channels. Consequently, the channel used by the current speaker is identified as a dominant channel.

Then, data pertaining to the a participant who uses the dominant channel is disseminated 403 to one or more of remaining participant of the conference call, say by a current speaker data disseminator 303, as described in further detail hereinabove.

By disseminating 403 the data pertaining to the participant who uses the dominant channel, the participant who uses the dominant channel is identified to the remaining participants as a current speaker, in real time.

The dissemination 403 of the data pertaining to the current speaker to the remaining participants of the call may be carried out using one of the relevant technologies known in the art.

The relevant technologies known in the art include, but are not limited to technologies such as:
- Flash SMS (also referred to as Alert SMS) messages.
- USSD (Unstructured Supplementary Service Data) messages.
- Open GPRS (General Packet Radio Service) connection to client agents installed on telephony devices used by the remaining participants.
- ISDN (Integrated Services Digital Network) User Part (ISUP) User-To-User (USR) Messages.
- RTP (Real Time Transport Protocol) packets.
- RTCP (Real Time Control Protocol) control data packets, such as SDES (Source Description) packets.
- SIP (Session Initiation Protocol) Message Method.
- H.225 (a standard protocol, which is a part of The International Telecommunications Union's H.323 videoconferencing over local area networks and packet-switched networks set of standard).

That is to say, channels are continuously monitored throughout the conference call. Whenever one of the participants speaks, the specific channel used by the current speaker is identified in real time as a dominant channel 402. The data pertaining to the current speaker is disseminated 403 in real time to one or more of remaining participants of the conference call, as described in further detail hereinabove.

Figure 5:
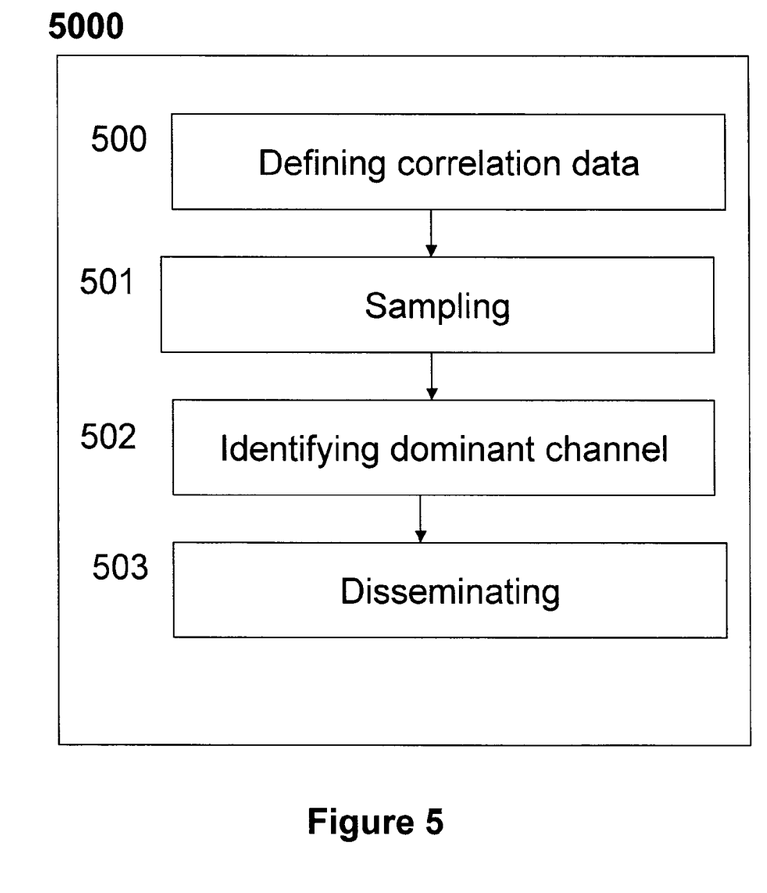
FIG. 5 is a flowchart illustrating another method for identifying participants of a conference call in a telephony network, according to an exemplary embodiment of the present invention.

Reference is now made to FIG. 5, which is a flowchart illustrating another method for identifying participants of a conference call in a telephony network, according to an exemplary embodiment of the present invention.

According to method 5000, there is defined correlation data 500 between one or more of the participants of the conference call and a specific channel used by the participant, by, for example, a correlation data definer 307, as described in further detail hereinabove. Optionally, the defined correlation data is stored in correlation data storage 375, such as a database.

Then, the channels are continuously sampled 501, by, for example, a sampler 301, throughout the conference call, in real time, as described in further detail hereinabove.

The channels may be sampled with respect to qualities of audio signals transmitted through the channel, such as intensity of the signal, intensity of the audio signal over a predefined frequency range, intensity of the signal over a predefined period of time (say, a frequency range characteristic of human voice), signal frequency range(s), or a combination of qualities.

The sampled channels are continuously compared with respect to the sampled quality.

Whenever one of the participants of the conference call speaks, the participant's channel is identified 502, based on the sampling and comparing, as described in further detail hereinabove.

The dominant channel is identified 502 in real time by a dominant channel identifier 302, which compares the sampled channels with respect to the sampled quality, as described in further detail hereinabove.

Then, based on the correlation data defined 500, data pertaining to current speaker (i.e. the participant who uses the dominant channel) is disseminated 503 to one or more of remaining participants of the conference call, in real time, as described in further detail hereinabove.

Optionally, the data pertaining to the current speaker is disseminated by a current speaker data disseminator 303, as described in further detail hereinabove.

By disseminating 503 the data, the participant who uses the dominant channel is identified to the remaining participants as a current speaker, in real time.

The dissemination 503 of the data pertaining to the current speaker to the remaining participants of the call may be carried out using one of relevant known in the art technologies, as described in further detail hereinabove.

As the channels are continuously monitored throughout the conference call, whenever one of the participants speaks, the specific channel used by the current speaker is identified 502 in real time as a dominant channel. Data pertaining to the current speaker is disseminated 503 in real time to one or more of remaining participants of the conference call, as described in further detail hereinabove.

Figure 6:
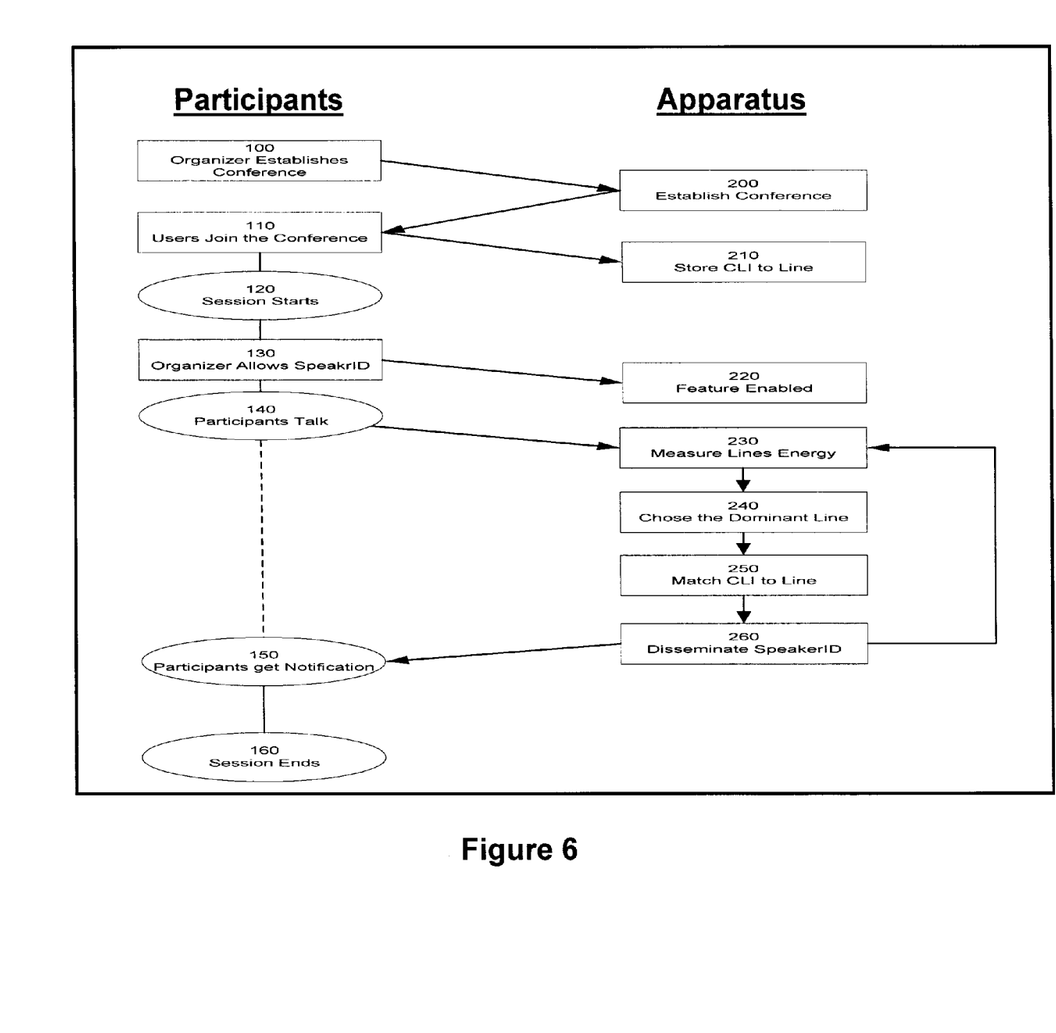
FIG. 6 is a flowchart illustrating yet another method for identifying participants of a conference call in a telephony network, according to an exemplary embodiment of the present invention.

Reference is now made to FIG. 6, which is a flowchart illustrating another method for identifying participants of a conference call in a telephony network, according to an exemplary embodiment of the present invention.

An exemplary method illustrated using FIG. 6 is implemented using an apparatus 3000, as described in further detail hereinabove.

An audio conference call starts as a telephony user who organizes the conference call initiates the conference call 100, and invites other telephony users to participate in the conference.

The audio conference is established 200 (say, by the audio conference mixer 309 and audio conference management application 308 described in further detail hereinabove), and the invited users join the conference 110.

Whenever a new participant joins 110 the conference (including the organizer of the audio conference), the line identification of the participant is used to define and store correlation data, say by a data correlation definer 307, as described in further detail hereinabove.

The correlation data correlates between the channel (e.g., phone line) used by the participant, and the participant's identification data.

The participant's identification data may include, but is not limited to line identification data as received from the specific channel used by the new participant. Exemplary line identification data includes: '54653', '+972-3-456840', 'Alice@domain.co.uk', etc.

When the audio conference session starts 120 (i.e. when all participants are connected in the conference call), the organizer initiates a conference participant identification service 130, and the service is enabled 220.

Optionally, the conference participant identification service is enabled separately for each of the channels used by the participants of the conference call. Optionally, the service is enabled on a selective basis, where only a participant who subscribes to the service in advance receives data pertaining to a current speaker, as described in further detail hereinbelow.

Throughout the audio conference session, the channels used by the participants are continuously sampled 230 (say by a sample 301 which measures the audio energy in each of the channels).

The sampled channels are continuously compared, for identifying 240 a dominant channel amongst the channels, by for example a dominant channel identifier 302, as described in further detail hereinabove.

Whenever a participant speaks 140, the channel used by the current speaker is identified as a dominant channel 240 amongst the channels sampled 230.

Next, in block 250, there is found participant's identification data pertaining to the participant who speaks, using the correlation data generated when each participant joins the conference, as described in further detail hereinabove. The participant's identification data may be retrieved by the current speaker data disseminator 303, as described in further detail hereinabove.

The data pertaining to the current speaker (the participant who speaks) is disseminated in real time to one or more participants of the audio conference, say by the current speaker data disseminator 303, as described in further detail hereinabove.

The method is implemented in a continuous and cyclic manner.

The channels are continuously sampled 230 (by for example the sampler 301) and compared (by for example a dominant channel identifier 302) throughout the conference call.

Whenever one of the participants speaks, the specific channel used by the current speaker is found to significantly differ from the remaining channels (for example, with respect to signal intensity, as described in further detail hereinabove).

Consequently, the channel used by the current speaker is identified 240 in real time as a dominant channel.

Then, data pertaining to the current speaker is disseminated 260 in real time to one or more of remaining participants of the conference call, as described in further detail hereinabove.

Optionally, the sampling of the channels includes audio filtration of audio signals transmitted in each of the signals.

Optionally, the audio filtration is implemented by an audio conference mixer 309, using one or more vocoder(s) (voice coder—a speech analyzer and synthesizer), as known in the art. The vocoders may use signal bandwidth filters, which filter out noise, and filter in human voice, using techniques known in the art.

In block 150, the participant receives the disseminated data.

In block 160, the conference session ends.

Dissemination Techniques

The dissemination of the data pertaining to the current speaker, in VoIP networks, may utilize RTP (Real Time Transport). RTP is the Internet standard protocol for transport of real-time media data, such as audio and video, as known in the art.

RTP typically runs on top of UDP (User Datagram Protocol)—a transport layer protocol for the Internet. UDP is a protocol which adds a level of reliability and multiplexing to IP (Internet Protocol) Datagrams. UDP is defined in RFC 768, as known in the art. A datagram is an independent, self-contained message sent over the network, as known in the art.

The dissemination may also utilize RTCP (Real Time Control Protocol). RTCP is a control protocol used for control and diagnostic of RTP sessions. Like RTP, RTCP typically runs on top of UDP and is defined in the RFC 3550), as known in the art.

As described in further detail hereinabove, the audio conference mixer 309 mixes audio data packets (or audio signals) received from the participants of the conference call through the data channels 305 into a single mixed signal. Then, the resultant mixed signal is sent back to all participants, through the data channels 305.

Optionally, the resultant mixed signal is a combined RTP Stream of media packets. In the combined RTP stream, the mixer 109 indicates in each packet of the combined RTP stream, all Contributing Sources (SCRS). Each SCRS is a unique ID per each participant). The audio conference mixer 309 further indicates the mixer's ID, as an SSRC (Synchronization source).

RTCP includes a complementary feature called SDES (Source Description) packet. The SDES packet is used to provide a correlation between the SCRS (contributing sources) and more meaningful descriptions, such as the caller name, extension numbers, etc. The correlation may be based on correlation data, such as identification data of the telephony user, as provided by a telephony network operator.

In SIP (Session Initiation Protocol) based networks, the mixer audio conference 309 may send an SDES packet with a CNAME (Canonical Name) copied from SIP headers in the SIP INVITE message (e.g. the SIP URI or the FROM headers). An IP Phone used by a participant of the conference, which supports extraction of the SDES Packet, may present the information in the SDES packet, on the IP Phone's screen.

Thus, the Speaker Data Disseminator 303 may use the audio conference mixer 309, to transmit an SDES packet which indicates the CNAME of the specific channel used by the current speaker (i.e the dominant channel at that moment), to remaining participants of the audio conference, as described in further detail hereinbelow.

Alternatively, in the SIP based network, the data pertaining to the current speaker may also be sent using an SIP MESSAGE method, as known in the art. The SIP MESSAGE acts similarly to a Short Message and an Instant Message in VoIP networks. That is to say that the data is usually presented immediately on a VoIP Handset's screen of a participant In H.323 Networks, the CNAME may be based on Calling Party Number or CLI fields which are a part of the H.225 Protocol's SETUP Message, as known in the art.

Optionally, in GSM networks, the identification of the current speaker is captured by the correlation data definer 307 implemented on the mixer 309.

In the GSM networks, the audio mixer mixer 309 terminates the ISUP Signaling of all channels used by the participants of the audio conference call. The identification of the current speaker may be taken from the CLI or Calling Party Number in the Incoming IAM messages.

In the GSM networks, the dissemination of the data pertaining to the current speaker (i.e. the participant using the channel identified as the dominant channel) may be carried out using one of relevant known in the art technologies.

The relevant known in the art technologies include, but are not limited to technologies such as:
  Flash SMS (also referred to as Alert SMS) messages. Flash SMS messages are class 0 messages. Class 0 SMS messages are presented immediately on a cellular phone's screen, unlike regular SMS messages. That is to say, the class 0 message is immediately present on the screen of the participant's phone, and the participant does not have to press any button prior to reading the message.
  USSD (Unstructured Supplementary Service Data) messages, as known in the art.
  Open GPRS (General Packet Radio Service) connection to client agents installed on telephony devices used by the remaining participants. For example, when the Audio Conference is established during a MIM (Mobile IM) session, the client application designates the speaking person in real time from the participant's phone predefined contact list, as known in the art.
  ISDN (Integrated Services Digital Network) User Part (ISUP) User-To-User (USR) messages. The ISUP USR messages are mid-call events. The ISUP USR messages may be used to disseminate the data to a participant who uses a phone handset installed with a dedicated client agent. The client agent is programmed to receive the ISUP USR information, and presents the content on the phone's screen, in the middle of the phone call (i.e. the audio phone conference).
  SIP MESSAGE method, as described in further detail hereinabove.

Figure 7:
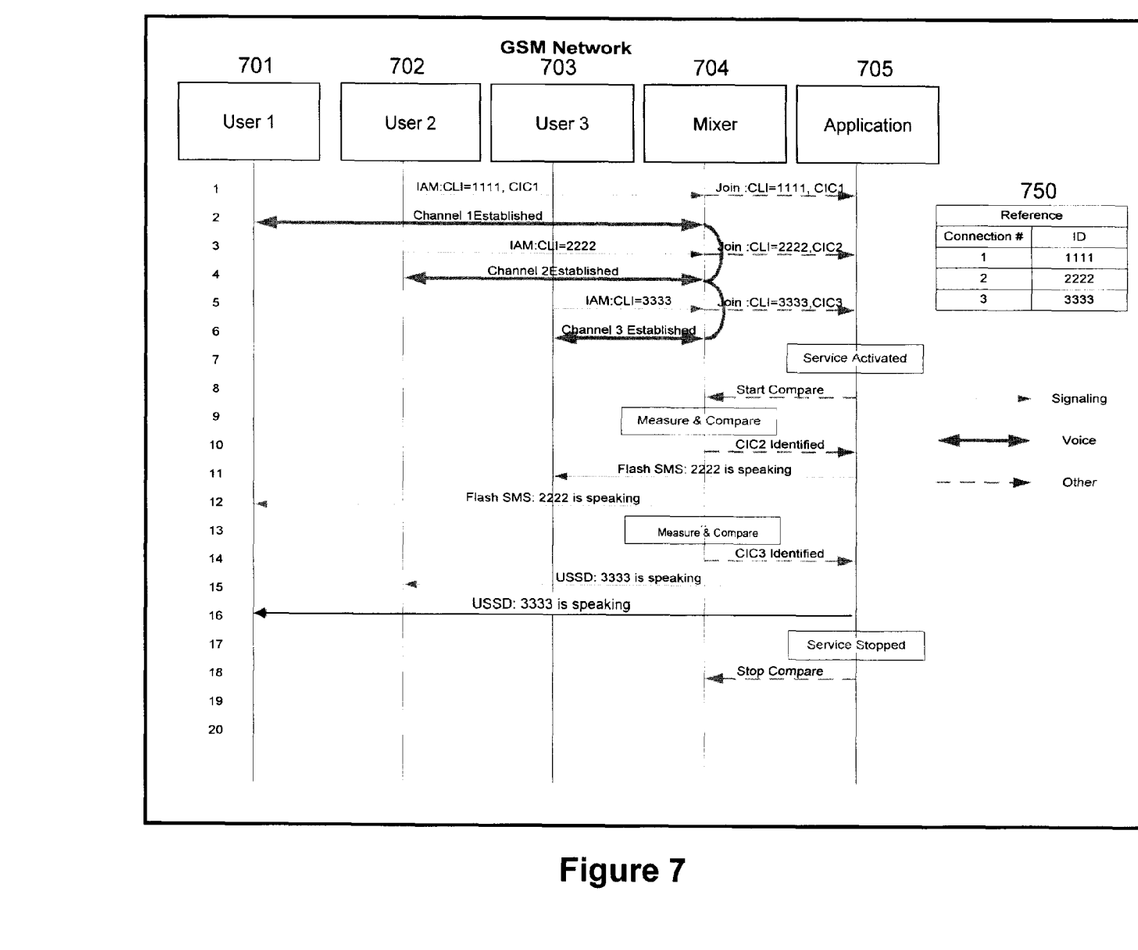
FIG. 7 is a simplified flowchart illustrating an exemplary participant identification scenario in a conference call, implemented in a GSM telephony network.

Reference is now made to FIG. 7, which is a simplified flowchart illustrating an exemplary participant identification scenario in a conference call implemented in a GSM telephony network, according to an exemplary embodiment of the present invention.

User 1, User 2 and User 3 (701-703) share an audio conference call in a GSM (Global System for Mobile Communications) Telephony Network, as known in the art.

The conference call is managed using a mixer 704 and a conference management application 705, as described in further detail hereinabove.

The three users 701-703 connect with ISUP (ISDN User Part) IAM (Initial Address messages) 1, 3, 5, to the mixer 704.

Then, the mixer 704 opens 2, 4, 6 a channel for each of the participants (i.e. users 1-3, respectively).

The mixer 704, (or a correlation data definer implemented on the mixer 704) defines data, which correlates between each channel and a specific one of the users 1-3, and forwards the correlation data to the conference management application 705.

In one example, the correlation data is stored in a reference table 750, on correlation data storage.

Exemplary reference table 750 correlates between the connection number (CIC) which is the port used by each participant (i.e. a participant specific channel), and the participant's ID. The reference table 750 is accessible by a speaker data disseminator, implemented as a part of the conference management application 705, as described in further detail hereinabove.

Typically, the establishment of the conference call includes additional messages (not shown), as known in the art.

Upon activation of the audio conference session 7, the conference management application 705 instructs a sampler implemented on the mixer 704 to start continuously sampling the channels with respect to audio signal energy in each of the channels. The conference management application 705 further instructs a dominant channel identifier implemented on the mixer 704 to start continuously comparing the sampled channels, with respect to the audio signal energy sampled in the channels.

When user 2 speaks, the dominant channel identifier, which compares 8 the audio energy in the sampled channels throughout the audio conference session, finds that the audio energy in Channel No. 2 is the strongest, and identifies 10 Channel No. 2 as a dominant channel, as described in further detail hereinabove.

A speaker data disseminator implemented as a part of the conference management application 705 retrieves the ID of the participant who uses channel No. 2 from the reference table 750: '2222'.

The speaker data disseminator implemented as a part of the conference management application 705 disseminates '2222' to users 1 and 3, in Flash SMS messages 11, 12, thus identifying '2222' (i.e. user 2) to users 1 and 3, as a current speaker.

The sampler (implemented on the mixer 704) continues to sample 13 the channels.

The dominant channel identifier (also implemented on the mixer 704) continuously compares the sampled channels and identifies 14 which is the dominant channel, in accordance with the sampling and comparing, as described in further detail hereinabove.

When user 3 speaks, the dominant channel identifier, implemented on the mixer 704, identifies 14 Channel No. 3 as the dominant channel, and informs a speaker data disseminator (implemented as a part of the conference management application 705) which channel is dominant.

The speaker data disseminator retrieves the ID of the participant who uses channel No. 3 from the reference table 750: '3333'.

The speaker data disseminator implemented as a part of the conference management application disseminates '3333' to users 1 and 2, in USSD messages 15, 16, thus identifying '3333' (i.e. user 3) to users 1 and 2, as a current speaker.

When the audio conference session ends 17, the conference management application 705 instructs the sampler implemented on the mixer 704 to stop sampling 18 the channels. Similarly, the dominant channel identifier is instructed to stop comparing 18 the channels.

Figure 8:
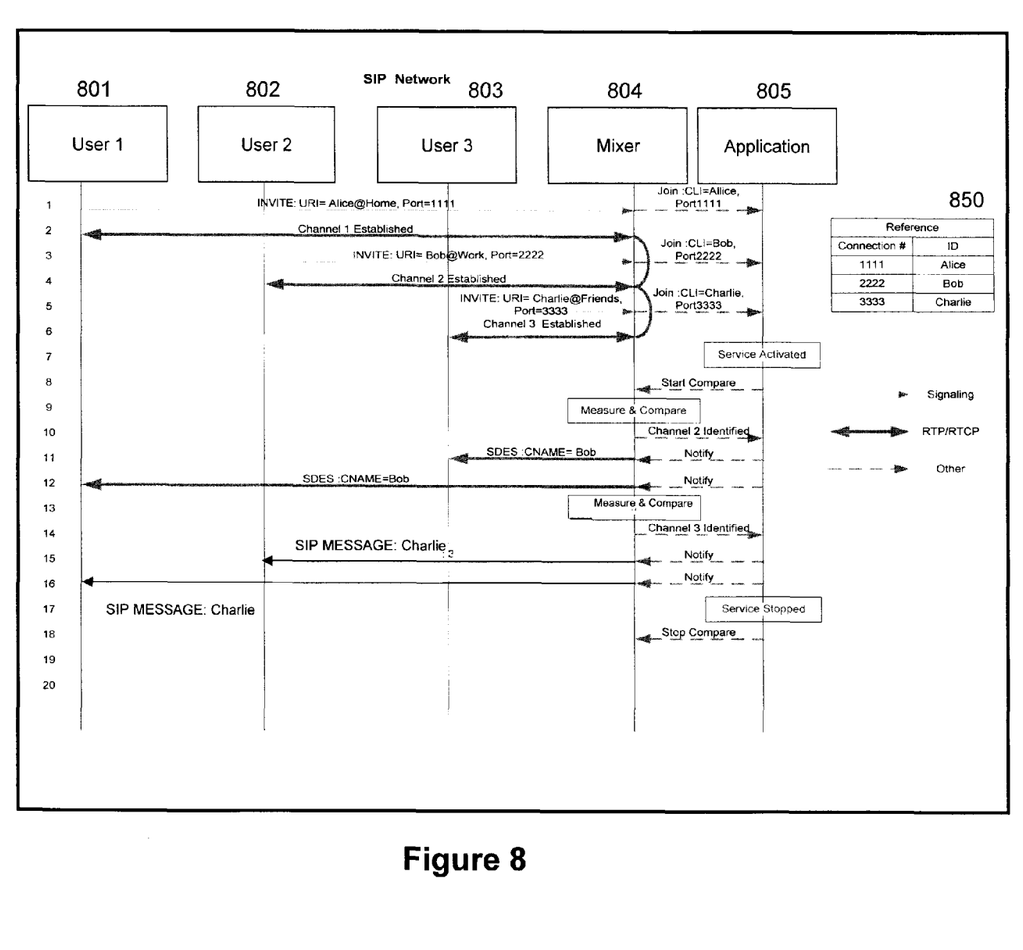
FIG. 8 is a simplified flowchart illustrating an exemplary participant identification scenario in a conference call, implemented in an SIP network.

Reference is now made to FIG. 8, which is a simplified flowchart illustrating an exemplary participant identification scenario in a conference call implemented in an SIP network, according to an exemplary embodiment of the present invention.

User 1, User 2 and User 3 (801-303) share an audio conference call in an SIP (Session Initiation Protocol) Telephony Network, as known in the art.

The conference call is managed using a mixer 804 and a conference management application 805, as described in further detail hereinabove.

The three users 801-803 connect with SIP INVITE Messages (Steps 1, 3, 5) to the mixer (804), which acts as an SIP User Agent (UA), as known in the art.

Then, the mixer 804 opens 2, 4, 6 an RTP/RTCP channel (i.e. RTP port) for each of the participants (i.e. users 1-3, respectively).

The mixer 804, (or a correlation data definer implemented on the mixer 804) defines data, which correlates between each channel and a specific one of the users 1-3, and forwards the correlation data to the conference management application 805.

In one example, the correlation data is stored in a reference table 850, on correlation data storage.

Exemplary reference table 850 correlates between the RTP port which is the port used by each participant (i.e, a participant specific channel), and the participant's ID. The participant's ID is based on the User's URI (Uniform Resource Identifier). A SIP URI is the SIP addressing schema to call another person via SIP. In other words, a SIP URI is a user's SIP phone number. The SIP URI may resemble an e-mail address.

The reference table 850 is accessible by a speaker data disseminator, implemented as a part of the conference management application 805, as described in further detail hereinabove.

Typically, the establishment of the conference call includes additional messages (not shown), as known in the art.

Upon activation of the audio conference session 7, the conference management application 805 instructs a sampler implemented on the mixer 804 to start sampling the channels, with respect to signal intensity over a predefined frequency range characteristic of human voice. The conference management application 805 also instructs a dominant channel identifier (also implemented on the mixer 804) to start comparing the sampled channels The dominant channel identifier (implemented on the mixer 804) compares 8 the signal intensity over the predefined frequency range in the sampled channels, throughout the audio conference session.

When user 2 speaks, the dominant channel identifier 804 finds that the signal intensity in Channel No. 2 is the strongest, thus identifying 10 channel 2 (RTP Port No. 2222) as a dominant channel, as described in further detail hereinabove.

A speaker data disseminator implemented as a part of the conference management application 805 retrieves the ID of the participant who uses Port No. 2222 from the reference table 850: 'Bob'.

The speaker data disseminator implemented as a part of the conference management application 805 disseminates the participant CNAME (Canonical Name)—'Bob' to users 1 and 3: The speaker data disseminator instructs the mixer 804 to send RTCP SDES messages with user 2's CNAME correlated with its respective CSRC indicator (i.e. 'Bob') to users 1 and 3, thus identifying user 2 to users 1 and 3, as a current speaker.

The sampler (implemented on the mixer 804) keeps continuously sampling 13 the channels. The dominant channel identifier (also implemented on the mixer 804) continuously compares the sampled channels.

Whenever one of the participants speaks, the dominant channel identifier identifies 13 which is the dominant channel, in accordance with the sampling and comparing, as described in further detail hereinabove.

When user 3 speaks, the dominant channel identifier, implemented on the mixer 804, identifies 14 Channel No. 3 (RTP Port No. 3333) as the dominant channel.

The speaker data disseminator implemented as a part of the conference management application 805 retrieves the ID of the participant who uses Port No. 3333 from the reference table 850: 'Charlie'.

The speaker data disseminator implemented as a part of the conference management application disseminates 'Charlie' to users 1 and 2, in SIP MESSAGE 15, 16, thus identifying 'Charlie' (i.e. user 3) to users 1 and 2, as a current speaker.

When the audio conference session ends 17, the conference management application 805 instructs the sampler to stop sampling 18 the channels. Similarly, the dominant channel identifier is instructed to stop comparing 18 the channels.

Relevant references, which provide specifications for the protocols and standards discussed hereinabove include, but are not limited to: RFC 3261—Session Initiation Protocol, RFC 3550 (entitled "RTP: A Transport Protocol for Real-Time Applications": http://tools.ietf.org/html/rfc3550, RFC 4575 entitled "A Session Initiation Protocol (SIP) Event Package for Conference State": http://tools.ietf.org/html/rfc4575, 3GPP TS 23.038, which describes Alphabets and language-specific information, RFC 3389—Real-time Transport Protocol (RTP) Payload for Comfort Noise (CN), etc.. as known in the art.

It is expected that during the life of this patent many relevant devices and systems will be developed and the scope of the terms herein, particularly of the terms "SIP", "SDES", "CNAME", "RTP", "RTCP", "GSM", "VoIP", and "USSD" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An apparatus for identifying participants of a conference call in a telephony network, each participant using a respective channel to participate in the conference call, the apparatus comprising:
a sampler, deployed in the telephony network, and configured to continuously sample each of the channels during the conference call;
a dominant channel identifier, in communication with said sampler, and configured to identify in real time a dominant one of the sampled channels; and
a current speaker data disseminator, in communication with said dominant channel identifier, and configured to disseminate in real time, through the sampled channels, data pertaining to a participant who uses the dominant channel to at least one remaining participant of the conference call, so as to identify the participant who uses the dominant channel as a current speaker to the at least one remaining participant.

2. The apparatus of claim 1, wherein said dominant channel identifier is further configured to compare the sampled channels with respect to audio signal energy, for identifying said dominant channel.

3. The apparatus of claim 1, wherein said dominant channel identifier is further configured to compare the sampled channels with respect to signal intensity, for identifying said dominant channel.

4. The apparatus of claim 1, wherein said dominant channel identifier is further configured to compare the sampled channels with respect to signal intensity over a predefined frequency interval, for identifying said dominant channel.

5. The apparatus of claim 1, wherein said dominant channel identifier is further configured to compare the sampled channels with respect to signal intensity over a predefined period of time, for identifying said dominant channel.

6. The apparatus of claim 1, wherein said dominant channel identifier is further configured to compare the sampled channels with respect to signal frequency, for identifying said dominant channel.

7. The apparatus of claim 1, further comprising a correlation data definer, configured to define correlation data between at least one of the participants and the respective channel used by the participant, wherein said current speaker data disseminator is further configured to use the correlation data for identifying the participant who uses the dominant channel as a current speaker to the at least one remaining participant of the conference call.

8. The apparatus of claim 1, wherein said current speaker data disseminator is further configured to disseminate predefined line identification data pertaining to the participant who uses the dominant channel to the at least one remaining participant of the conference call.

9. The apparatus of claim 1, wherein said current speaker data disseminator is further configured to disseminate data pertaining to the participant who uses the dominant channel to at least one remaining participant of the conference call, using RTP (Real Time Protocol).

10. The apparatus of claim 1, wherein said current speaker data disseminator is further configured to disseminate data pertaining to the participant who uses the dominant channel to at least one remaining participant of the conference call, using RTCP (Real Time Control Protocol) SDES.

11. The apparatus of claim 1, wherein said current speaker data disseminator is further configured to disseminate data pertaining to the participant who uses the dominant channel to at least one remaining participant of the conference call, using SIP (Session Initiation Protocol) MESSAGE Method.

12. The apparatus of claim 1, wherein said current speaker data disseminator is further configured to disseminate data pertaining to the participant who uses the dominant channel to at least one remaining participant of the conference call, using H.22S.

13. The apparatus of claim 1, wherein said current speaker data disseminator is further configured to disseminate data pertaining to the participant who uses the dominant channel to at least one remaining participant of the conference call, using ISDN User Part (ISUP) User-To-User (USR) Messages.

14. The apparatus of claim 1, wherein said current speaker data disseminator is further configured to disseminate data pertaining to the participant who uses the dominant channel to at least one remaining participant of the conference call, using Flash SMS (Short Message Service) Messages.

15. The apparatus of claim 1, wherein said current speaker data disseminator is further configured to disseminate data pertaining to the participant who uses the dominant channel to at least one remaining participant of the conference call, using Unstructured Supplementary Service Data (USSD) messages.

16. The apparatus of claim 1, wherein said current speaker data disseminator is further configured to disseminate the data pertaining to the participant who uses the dominant channel to at least one remaining participant of the conference call, using an open General Packet Radio Service GPRS connection to client agents installed on telephony devices used by the at least one remaining participant.

17. The apparatus of claim 1, wherein said current speaker data disseminator is further configured to disseminate data pertaining to the participant who uses the dominant channel only to predefined participants of the conference call.

18. The apparatus of claim 1, further comprising an audio conference mixer associated with said sampler and the channels, and configured to handle telephony control of the conference call.

19. The apparatus of claim 1, further comprising a conference management application associated with said current speaker data disseminator, and configured to manage the conference call.

20. The apparatus of claim 1, wherein said sampler is further configured to filter audio signals transmitted in the sampled channels.

21. A method for identifying participants of a conference call in a telephony network, each participant using a respective channel to participate in the conference call, the method comprising:
continuously sampling each of the channels during the conference call;
identifying, in real time, a dominant one of the sampled channels; and
disseminating, in real time, through the sampled channels, data pertaining to a participant who uses the dominant channel to at least one remaining participant of the conference call so as to identify the participant who uses the dominant channel as a current speaker to the at least one remaining participant.

22. The method of claim 21, further comprising comparing the sampled channels with respect to audio signal energy, for identifying said dominant channel.

23. The method of claim 21, further comprising defining correlation data between at least one of the participants and the respective channel used by the participant, wherein said identifying of the dominant channel is carried out using said correlation data.

24. The method of claim 21, further comprising disseminating predefined line identification data pertaining to the participant who uses the dominant channel to at least one remaining participant of the conference call.

25. The method of claim 21, further comprising disseminating predefined line identification data pertaining to the participant who uses the dominant channel to at least one remaining participant of the conference call, through the sampled channels.

26. The method of claim 21, wherein said disseminating is carried out using RTCP Source Description (SDES).

27. The method of claim 21, wherein said disseminating is carried out using ISDN User Part (ISUP) User-To-User (USR) Messages.

28. The method of claim 21, wherein said disseminating is carried out using Flash SMS (Short Message Service) Messages.

29. The method of claim 21, wherein said disseminating is carried out using Unstructured Supplementary Service Data (USSD) messages.

30. The method of claim 21, wherein said disseminating is carried out using an open General Packet Radio Service GPRS connection to client agents installed on telephony devices used by the remaining participants.

31. The method of claim 21, wherein said disseminating is carried out using SIP (Session Initiation Protocol) MESSAGE Method.

32. The method of claim 21, wherein said data pertaining to the participant who uses the dominant channel is disseminated only to predefined participants of the conference call.

* * * * *

UNITED STATES PATENT AND TRADEMARK OFFICE
CERTIFICATE OF CORRECTION

| | | |
|---|---|---|
| PATENT NO. | : 8,179,821 B2 | Page 1 of 1 |
| APPLICATION NO. | : 11/767726 | |
| DATED | : May 15, 2012 | |
| INVENTOR(S) | : Nachum | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1351 days.

Signed and Sealed this
Thirty-first Day of July, 2012

David J. Kappos
*Director of the United States Patent and Trademark Office*